United States Patent
Loucks

(10) Patent No.: US 12,552,437 B2
(45) Date of Patent: Feb. 17, 2026

(54) RETROFIT SANITARY HANDLE

(71) Applicant: Dajcor Aluminum Ltd., Chatham (CA)

(72) Inventor: William J. Loucks, Chatham (CA)

(73) Assignee: Dajcor Aluminum Ltd., Chatham (CA)

( * ) Notice: Subject to any disclaimer, the term of this patent is extended or adjusted under 35 U.S.C. 154(b) by 429 days.

(21) Appl. No.: 18/041,853

(22) PCT Filed: Oct. 19, 2021

(86) PCT No.: PCT/CA2021/051472
§ 371 (c)(1),
(2) Date: Feb. 16, 2023

(87) PCT Pub. No.: WO2022/036465
PCT Pub. Date: Feb. 24, 2022

(65) Prior Publication Data
US 2024/0010260 A1    Jan. 11, 2024

Related U.S. Application Data

(63) Continuation-in-part of application No. 16/873,941, filed on Aug. 20, 2020, now abandoned.

(51) Int. Cl.
*B62B 5/06* (2006.01)
*A61L 2/238* (2006.01)

(52) U.S. Cl.
CPC .............. *B62B 5/069* (2013.01); *A61L 2/238* (2013.01)

(58) Field of Classification Search
CPC .................................. B62B 5/069; A61L 2/238
See application file for complete search history.

(56) References Cited

U.S. PATENT DOCUMENTS 2,935,230 A * 5/1960 Wolf ...................... A47G 19/24
 225/56
4,955,914 A * 9/1990 Caniglia ................ A61J 17/113
 606/235

(Continued)

FOREIGN PATENT DOCUMENTS

DE           29901864 U1 *  6/1999 ............... B62B 5/06
DE     202008010201 U1 * 12/2009 .......... B41F 23/0403

(Continued)

OTHER PUBLICATIONS

International Search Report issued by ISA/CA in connection with PCT/CA2021/051472 dated Feb. 25, 2022.

(Continued)

*Primary Examiner* — Jacob B Meyer
(74) *Attorney, Agent, or Firm* — Levenfeld Pearlstein, LLC

(57) ABSTRACT

A sanitary covering is retrofit over an existing handle or railing, particularly a shopping cart handle. A stability-enhancing element in the form of compression foam is adhesively secured to an existing handle. A metal cover, such as of anodized aluminum, with a pathogen-eliminating outer surface (such as a biocidal or antimicrobial coating), jackets the compression foam. The cover may be in two parts having elements interlocking them together so as to be securely attached together and securely engage the compression foam. A method of retrofitting a sanitary covering over an existing handle or rail is also provided utilizing a stability-enhancing element and a metal cover with a biocidal or antimicrobial outer coating.

17 Claims, 1 Drawing Sheet

(56) References Cited

U.S. PATENT DOCUMENTS

| | | | | |
|---|---|---|---|---|
| 5,215,319 | A * | 6/1993 | Farris | B62B 5/06 D34/27 |
| 5,427,392 | A * | 6/1995 | Duer | B62B 5/06 D34/27 |
| 5,429,377 | A * | 7/1995 | Duer | B62B 5/06 150/154 |
| 5,820,142 | A * | 10/1998 | Duer | A61L 2/22 150/154 |
| 6,065,764 | A * | 5/2000 | Moseley | B62B 5/06 280/33.993 |
| 6,158,640 | A * | 12/2000 | Karp | B62B 3/1428 248/230.1 |
| 6,543,794 | B1 * | 4/2003 | Tyree | B62B 5/06 280/33.992 |
| 6,817,066 | B1 * | 11/2004 | Williams | B62B 3/1456 16/110.1 |
| 6,854,163 | B1 * | 2/2005 | Ruana | B60N 3/02 116/1 |
| 6,869,085 | B2 * | 3/2005 | Pettigrew | B62B 5/06 280/33.991 |
| 6,981,707 | B1 * | 1/2006 | Dandy | B62B 5/06 280/33.993 |
| D521,207 | S * | 5/2006 | Anderson | B62B 5/069 D34/27 |
| 7,735,842 | B2 * | 6/2010 | Brady | G07F 7/0663 16/904 |
| 8,019,524 | B2 | 9/2011 | Oishi et al. | |
| 8,650,715 | B2 * | 2/2014 | Sonnendorfer | B41F 23/0403 16/436 |
| 8,714,215 | B2 * | 5/2014 | Badgley | E05B 1/0069 224/411 |
| 8,864,148 | B2 * | 10/2014 | Preisler | C08J 7/04 280/33.993 |
| 8,900,716 | B2 * | 12/2014 | Hodges | C23C 18/122 428/447 |
| 9,127,189 | B2 | 9/2015 | Blücher | |
| 9,452,905 | B2 * | 9/2016 | Muderlak | B62B 5/069 |
| 10,166,158 | B2 * | 1/2019 | Trinder, II | A61G 7/0507 |
| 11,021,182 | B1 | 6/2021 | DeGrazia | B62B 5/069 |
| 11,225,278 | B1 | 1/2022 | Harris | B62B 5/069 |
| 2002/0092132 | A1 * | 7/2002 | Kessler | B62B 5/06 16/436 |
| 2004/0021279 | A1 * | 2/2004 | Sobo | B62B 3/1436 280/33.992 |
| 2005/0028637 | A1 * | 2/2005 | Coty | B62B 3/1416 74/551.9 |
| 2005/0267233 | A1 * | 12/2005 | Joshi | E05B 1/0069 424/618 |
| 2006/0226614 | A1 * | 10/2006 | Brilliant | B62B 5/06 280/33.992 |
| 2007/0245850 | A1 * | 10/2007 | Ramali | B62B 5/06 74/551.9 |
| 2007/0267828 | A1 * | 11/2007 | Egizi | B62B 5/069 280/33.992 |
| 2008/0001371 | A1 * | 1/2008 | Rabiea | B62B 3/1408 280/33.992 |
| 2008/0191434 | A1 * | 8/2008 | Herron | B62B 5/069 16/431 |
| 2008/0303230 | A1 * | 12/2008 | Somberg | B62B 5/06 16/435 |
| 2010/0236674 | A1 * | 9/2010 | Badgley | B62B 5/06 150/154 |
| 2011/0182769 | A1 | 7/2011 | Rich | |
| 2012/0148783 | A1 * | 6/2012 | Kunkleman | B62B 5/069 428/43 |
| 2012/0240307 | A1 * | 9/2012 | Terrell | A41D 19/01594 2/167 |
| 2013/0078372 | A1 * | 3/2013 | Lazzari | A01N 25/34 16/110.1 |
| 2015/0004361 | A1 * | 1/2015 | Culpepper | A61L 2/03 442/6 |
| 2016/0046313 | A1 * | 2/2016 | Landwehr | B62B 5/069 280/33.992 |
| 2016/0288812 | A1 * | 10/2016 | Bailey | B62B 5/069 |
| 2018/0178823 | A1 * | 6/2018 | Yang | A61L 2/10 |
| 2020/0398883 | A1 | 12/2020 | Sisson et al. | |
| 2021/0085050 | A1 * | 3/2021 | Hinnebusch, Sr. | B62B 5/069 |
| 2021/0331731 | A1 * | 10/2021 | Nunes | B62B 5/069 |
| 2021/0394808 | A1 * | 12/2021 | Trask | B62B 5/069 |
| 2022/0054680 | A1 * | 2/2022 | Loucks | C09J 7/38 |
| 2022/0063695 | A1 * | 3/2022 | Haigler | B32B 27/36 |

FOREIGN PATENT DOCUMENTS

| | | | | |
|---|---|---|---|---|
| DE | 102011050881 | A1 * | 12/2012 | B62B 5/069 |
| DE | 202013001211 | U1 * | 2/2013 | B62B 5/069 |
| DE | 202020102127 | U1 * | 4/2020 | B62B 5/069 |
| DE | 202020102495 | U1 * | 5/2020 | B62B 5/069 |
| DE | 202020102869 | U1 * | 6/2020 | B62B 5/069 |
| DE | 202020103293 | U1 * | 6/2020 | B62B 5/069 |
| DE | 202020002363 | U1 * | 7/2020 | B62B 5/069 |
| DE | 102019102970 | A1 | 8/2020 | |
| FR | 2947509 | A1 | 12/2011 | |
| FR | 3111318 | A3 * | 12/2021 | B62B 5/069 |
| GB | 2501543 | A * | 10/2013 | B62B 5/069 |
| GB | 2594992 | A * | 11/2021 | B62B 5/069 |
| WO | 9715039 | A1 | 4/1997 | |
| WO | WO-2007114718 | A1 * | 10/2007 | B62B 3/1416 |
| WO | WO-2008090343 | A2 * | 7/2008 | B62B 5/06 |
| WO | WO-2014076589 | A1 * | 5/2014 | B62B 5/069 |
| WO | WO-2020237004 | A1 * | 11/2020 | B32B 17/10 |

OTHER PUBLICATIONS

Written Opinion issued by ISA/CA in connection with PCT/CA2021/051472 dated Feb. 25, 2022.

International Preliminary Report on Patentability issued by WIPO in connection with PCT/CA2021/051472 dated Feb. 21, 2023.

* cited by examiner

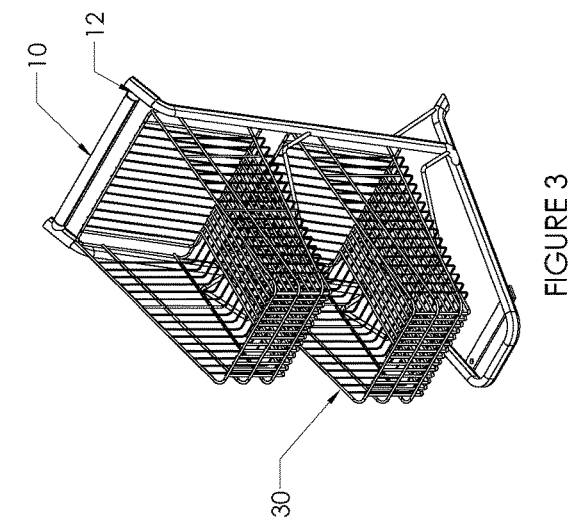
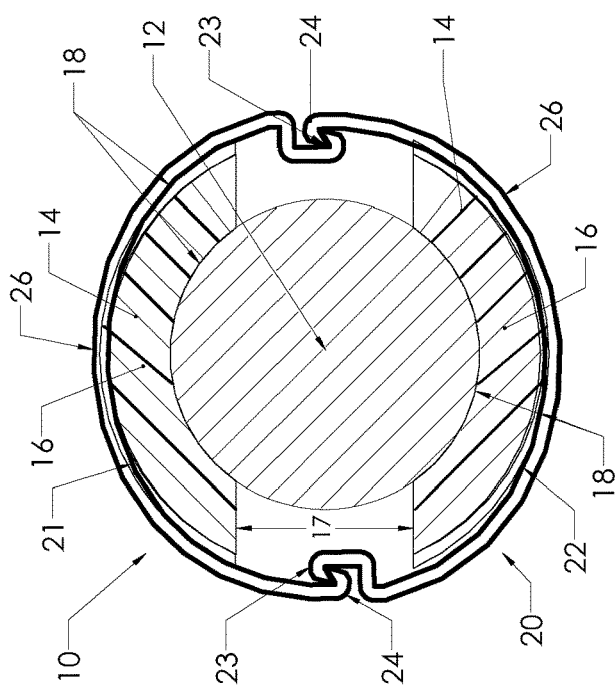
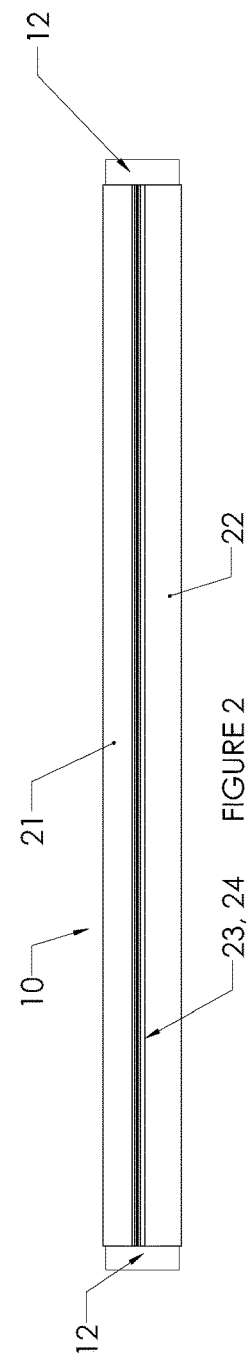

RETROFIT SANITARY HANDLE

CROSS-REFERENCE TO RELATED APPLICATION DATA

This application is a 35 U.S.C. 371 U.S. national stage filing of International Application No. PCT/CA2021/051472, having an international filing date of Oct. 19, 2021, which is a Continuation-In-Part of U.S. patent application Ser. No. 16/873,941, filed on Aug. 20, 2020, titled RETROFIT SANITARY HANDLE, the disclosures of which are incorporated herein in their entireties.

BACKGROUND

There are many surfaces that people touch in normal life that have the possibility of transmitting disease or illness-causing pathogens. For examples microbes (bacteria, protozoa, fungi, algae, amoebas, and slime molds), viruses, and like harmful organisms/pathogens can exist on handles, rails, and other surfaces for significant periods of time and can be transferred onto a human's skin when touched. If the human then touches her/his face, or the pathogen otherwise come into contact with sensitive tissue on the human's body, illness or disease may ensue. Common surfaces with this issue include shopping cart handles, hospital bed railings, fuel pump handles, commercial building door handles, and staircase railings.

There have been many proposals for dealing with the problem of pathogen transfer from a handle or railing to a human user. For example, U.S. Pat. No. 6,817,066 provides a removable foam rubber grip for a shopping cart handle that prevents the shopper's hands from coming into contact with a conventional grocery cart handle. U.S. Pat. Nos. 5,215,319 and 5,820,142 provide removable rigid plastic sanitary coverings for a shopping cart handle, and U.S. Pat. No. 8,109,524 utilizes an elongated flexible shopping cart handle cover with an interior anti-bacterial composition. U.S. Pat. No. 10,166,158 shows a rail cover assembly having top and bottom components made of antimicrobial or biocidal materials that couple together around railings to provide a sanitary gripping surface, and US Patent Publication No. 2005/0267233 teaches using a wide variety of antimicrobial components on a handle to allow sanitary usage of the handle. While all of these proposals can be effective under some circumstances, the present description seeks to provide a system and method that are more robust and permanent than are provided by most of the above teachings for preventing or at least minimizing the chances of pathogens from transferring from a handle or rail to a human's skin.

SUMMARY

According to one aspect, there is provided a system for sanitizing a handle or railing comprises a retrofit covering for a handle or railing that includes a stability-enhancing interior element, and a cover of metal (preferably aluminum) that has a pathogen-eliminating outer surface. The system of the invention is particularly applicable to shopping cart handles but is useful for a wide variety of other handles and rails.

The stability-enhancing interior element preferably comprises compression foam which operatively engages an existing handle or railing, such as by friction or by being attached thereto with an adhesive. Surrounding/jacketing the interior compression foam is a cover of a metal such as anodized aluminum with a pathogen-eliminating outer surface, which may comprise an antimicrobial or biocidal coating. Such coatings are described, for example, in US Patent Publ. 2005/0267233, PCT Publication WO/2021/113972, U.S. Pat. No. 6,929,705, or U.S. Pat. No. 8,900,716. The metal cover may comprise two components which have interlocking or inter-engaging elements which allow the components to be mechanically connected together and held in place to provide a new, pathogen-eliminating surface. Alternatively, the aluminum cover could comprise a single sleeve that is crimped at one or more locations to secure it over the foam interior.

According to another aspect, there is provided, in combination, an existing handle or railing having an outer surface; a compression foam structure, preferably adhesively secured to the outer surface of the handle; and a metal cover provided over the compression foam and having an outer surface, the outer surface having pathogen-eliminating properties. In one aspect, the metal cover is anodized aluminum with an antimicrobial or biocidal coating on the outer surface thereof. Preferably, the cover comprises two components with interlocking or inter-engaging elements to hold them together, or a single component crimped at one or more locations thereof. The existing handle or railing may comprise, for example, a shopping cart handle, although the present description would be applicable to other handles, railings, etc. Generally, the present description is applicable to any elongate structure.

According to yet another aspect, there is provided a method for retrofitting a sturdy sanitary cover on an existing handle or railing. The method comprises a) at least partially covering the existing handle or railing with a stability-enhancing element, and then b) jacketing the stability-enhancing element with a metal cover having an outer surface with pathogen-eliminating properties. In the method a) may be practiced by adhesively securing a compression foam to the existing handle or railing, and b) may be practiced utilizing an anodized aluminum cover with an outer coating of antimicrobial or biocidal material. In the method b) may be further practiced by interlocking together or inter-engaging two components, or by crimping a sleeve. The method is particularly applicable for use on a shopping cart handle although it could also be practiced on hospital bed railings, staircase railings, commercial building door handles, or other handles or rails.

In one aspect, the present description provides a robust system for sanitizing a handle or railing, and a method of retrofitting an existing handle or railing to provide an effective pathogen-eliminating user-engaging surface. This and other objects of the invention will become clear from a detailed description of the invention, and from the appended claims.

Thus, in one aspect, there is provided a covering for a handle or railing comprising: a stability-enhancing interior element adapted to be provided over the handle or railing; and a metal cover adapted to be provided over the stability-enhancing interior element; wherein the metal cover includes a pathogen-eliminating outer surface.

In another aspect, there is provided a system for sanitizing a handle or railing comprising a retrofit covering for the handle or railing; said retrofit covering including a stability-enhancing interior element, and a cover of metal that has a pathogen-eliminating outer surface.

In another aspect, there is provided a kit for providing a cover over a handle or railing, the kit comprising: a stability-enhancing interior element adapted to be provided over the handle or railing; and a metal cover adapted to be provided over the stability-enhancing interior element; wherein the metal cover includes a pathogen-eliminating outer surface.

In yet another aspect, there is provided a method for retrofitting a sanitary cover on an existing handle or railing, the method comprising:
a) at least partially covering the existing handle or railing with a stability-enhancing element; and
b) jacketing the stability-enhancing element with a metal cover having an outer surface with pathogen-eliminating properties.

BRIEF DESCRIPTION OF THE DRAWINGS

FIG. 1 is a cross-sectional end view of a retrofit sanitary handle system covering an existing shopping cart handle;

FIG. 2 is a side view of the handle system of FIG. 1; and

FIG. 3 is a perspective view of a shopping cart with the retrofit sanitary handle system of FIGS. 1 & 2 operatively provided thereon.

DETAILED DESCRIPTION

A retrofit sanitary handle system/covering according to the invention is shown generally by reference numeral 10 in FIGS. 1-3. The system 10 is adapted to be provided over an existing handle or railing 12, such as the handle of a shopping cart handle. It will be understood that the handle or railing 12 may comprise any such elongate article, such as a hospital bed railing, staircase railing, commercial building door handle, or a like handle or rail.

The system 10 includes a stability-enhancing interior element shown generally by reference numeral 14 in FIG. 1. In the preferred embodiment the stability-enhancing element comprises compression foam 16 which may optionally be secured by adhesive 18 (shown exaggerated in size in FIG. 1 for clarity of illustration only) to the handle or railing 12. In the embodiment illustrated, the foam 16 is provided in two portions which are spaced from each other as indicated by gaps 17 in FIG. 1. In the illustrated embodiment, the two portions of the foam are provided as upper and lower portions for reasons discussed below. It will be understood that the sections may be provided on any other orientation over the handle 12.

In another aspect, the foam 16 may comprise a single sleeve that is wrapped or slid over the handle or railing 12. It will be appreciated that where the foam 16 is provided in two pieces, as shown in FIG. 1, the use of an adhesive to secure such pieces to the handle facilitates installation. It will also be appreciated that where the foam 16 is a single sleeve, it may be possible to retain it in place over the handle 12 without the need for an adhesive.

The compression foam 16 preferably comprises a high or medium compression foam selected from the group consisting essentially of polyurethane, polyethylene, and neoprene foam, and combinations thereof. The foam may have a density of about 2-40 lbs./ft.$^3$, and which requires a pressure of about 4-15 psi to compress it 25%. Preferably the density is about 8-30 lbs./ft.$^3$ and requiring a psi of about 6-12 to compress it 25%. The adhesive 18 preferably comprises an acrylic and/or silicone adhesive with an effective operating range of −40 to 120° F. For providing the system of the present description on to a handle or railing 12, the surface of the handle or railing 12 is cleaned, such as with a liquid or spray isopropanol, or an alcohol wipe, and allowed to dry before applying adhesive 18. The foam 16 is then provided over the adhesive 18.

Jacketing the compression foam 16 and securely in engagement therewith is a metal cover shown generally by reference numeral 20 in FIG. 1. The metal may be selected from aluminum (e. g. 6060-T5) such as anodized aluminum, titanium, stainless steel, or a variety of other metals, with anodized aluminum being preferred. In the embodiment illustrated in FIG. 1 the cover 20 is formed by two components, an upper component 21, and a lower component 22. It will be understood from the present description that providing "upper" and "lower" components is preferred and that the components may be provided in other orientations as well. Mechanical elements are preferably provided to connect the components 21, 22 by interlocking or inter-engaging such elements together. In the preferred embodiment as illustrated in FIG. 1, the upper component 21 has one hook-shaped end 23 which receives an end projection 24 of the lower component 22, and vice-versa for the lower component 22. Alternatively, one component 21, 22 can have two hook-shaped ends 23 and the other component two end projections 24.

As can be seen in FIG. 1, the mechanical elements allow engagement of opposed sides of each component 21 and 22. It is also noted that, in the preferred aspect, the upper component 22 is a mirror image of the lower component 21. In this way, one side (in FIG. 1, the right side) of the upper component is adapted to fit under the adjacent side of the lower component, while the opposite side (in FIG. 1, the left side) of the upper component is adapted to fit over the adjacent side of the lower component. This arrangement may be preferred as it allows one side of the cover 20 to be hooked together over the foam 16, to in essence form a hinge, after which the opposite sides can be brought together and snapped to engage the mechanical elements 23, 24. It will also be understood that the two components 21, 22, can be brought together simultaneously to form a snap fit along both sides.

The interlocking/inter-engaging ends 23, 24 are provided in the gaps 17 between the two portions of the foam 16, as seen in FIG. 1 so that the components 21, 22 snap together, making a "clicking" sound when they do so. The ends 23, 24 securely fit together so that they will not separate during normal use of the handle system 10, by pressing the projections 24 into operative association with the hooks 23. The fit between the projections and hooks 23 may be clearance, transition, or interference, preferably a transition or interference fit. In any case preferably the cover 20 is held securely in place, and securely engages the foam 16. Optionally another layer (not shown) of the same adhesive as 18 may be provided between the foam 16 and the interiors of components 21, 22.

As illustrated in FIG. 1, when the two components 21 and 22 are connected, opposed seams are formed where the mechanical elements 23, 24 are joined. Aesthetically, it would be preferred for such seams to be provided on front and rear facing ends of a shopping cart handle, for instance. For this reason the components 21 and 22 would comprise "upper" and "lower" components so that the seams are not visible on a top view, where the palms of the user are typically placed.

As also illustrated in FIG. 1, the seams formed by the two components 21 and 22 are positioned in the vicinity of the gaps 17 if the foam 16 components are directly underneath respective components 21, 22. Thus, where the components 21 and 22 are provided as "upper" and "lower" components, corresponding "upper" and "lower" foam 16 components would also be provided. The gaps 17 are preferred so as to avoid the foam material from interfering with the engagement of the mechanical elements 23, 24. However, as noted above, it would be possible to use a unitary foam piece.

As will be understood from the present description, as the two components 21 and 22 are connected the underlying foam 16 is compressed. In this state, the foam 16 exerts a radially outward force against the components 21, 22, which serves to lock the components together owing the arrangement of the "hooks".

As an alternative to the components 21, 22, the cover 20 may be provided as a sleeve and crimped into contact with the foam substantially continuously along its length, or at one or more spaced locations.

The outer surface of the metal cover 20 has a pathogen-eliminating coating 26, shown greatly exaggerated in size in FIG. 1 for clarity of illustration only. The coating 26 may be a known biocidal or antimicrobial coating such as provided by the UmanProtek™ technology of A3 Surfaces of Chicoutimi, QC, Canada, and/or provided by a variety of known or to be developed techniques, such as shown in US Patent Publ. 2005/0267233, PCT Publication WO/2021/113972, U.S. Pat. Nos. 6,929,705, and/or 8,900,716, the entire disclosures of which are hereby incorporated by reference herein.

The covering 10 according to the description is shown in side view in FIG. 2. The length thereof will, of course, depend upon the length of the handle or rail 12 and the covering 10 may terminate just short of the ends of the handle or rail 12, as schematically illustrated in FIG. 2. An aspect of the description where the covering 10 is applied to the handle 12 of a conventional shopping cart 30 is illustrated in FIG. 3.

The present description also provides a method for retrofitting a sturdy sanitary covering 10 on an existing handle or railing 12. The method comprises: a) at least partially covering the existing handle or railing 12 with a stability-enhancing element 16 (or 16/18) as shown in FIG. 1; and then b) jacketing the stability-enhancing element 16 with a metal cover 20 having an outer surface (e. g. coating 26) with pathogen-eliminating properties. In the method a) may be practiced by adhesively (18) securing a compression foam 16 to the existing handle or railing 12. Also in the method b) may be practiced utilizing an anodized aluminum cover 20 with an outer coating 26 of antimicrobial or biocidal material. In the method b) may be further practiced by interlocking together or inter-engaging two components 21, 22 of the cover 20 (such as by using hook 23 and projection 24 ends thereof in a transition or interference fit, and snap together with a "clicking" sound) so that they are securely held together and preferably in secure contact with the stability-enhancing element 16; or alternatively b) is further practiced by tightly crimping a sleeve of aluminum into contact with the stability-enhancing element. In one aspect, a) and b) are practiced on a shopping cart handle 12 as the existing handle or railing, as seen in FIG. 3 for shopping cart 30.

In the present description, the foam component 16 has been described as "stability-enhancing". As will be understood by persons skilled in the art, this term is intended to mean that the foam serves to securely hold the metal cover 20 in place once attached to a handle or rail 12. In particular, as described above, the foam 16 is adapted to compress when the metal cover components are secured together, whereby the radially outward force exerted by the foam retains the cover components 21, 22 together. Further, the outward force would preferably also be sufficient to frictionally engage the cover 20 over the foam 16 so as to prevent axial rotation there-between. To further enhance the latter, an adhesive may be used to secure the cover 20 to the foam 16. The compression of the foam 16 as described above will also exert a radially inward force against the handle or rail 12. This would serve to frictionally engage the foam 16 over the handle 12, thus preventing axial rotation of the foam, and therefore the cover 20, over the handle 12. As noted above, in a preferred aspect, the foam 16 may be affixed over the handle 12 using an adhesive. This would further serve to prevent axial rotation of the foam over the handle 12.

As noted above, the present description is directed to a handle cover that can be retrofit onto an existing handle, such as a rail or a handle on a shopping cart, etc. Accordingly, it will be understood that the handle cover, or covering, described herein may have any length or diameter that would be suitable for accommodating various sizes of rails, handles and the like. The description is therefore not limited to any particular size or relative size that may be depicted in the attached figures. The figures illustrate one particular aspect where the presently described cover has utility for protecting the handles of shopping carts.

Similarly, although the existing handle as shown at 12 in FIG. 1 is illustrated as having a cylindrical outer surface, it will be appreciated that the present description is not limited to any specific shape of the handle. As will be understood, in view of the foam 16, the presently described handle cover may be fit, or retrofit, onto a wide variety of handle shapes.

It will also be appreciated that although the handle cover is shown as having a generally smoot, cylindrical outer surface, various other shapes may be possible. For example, the outer surface may have a ridged or textured surface or the cover may be axially curved.

In addition, given the retrofit nature of the description, it will be appreciated that the components of the present handle cover may be made commercially available in a kit form, whereby a purchaser would be able to secure the cover over a handle. In this regard, the kit may comprise the stability-enhancing, or foam, component 16, the cover component 20, and optionally, the respective adhesive(s) and/or instructions for assembling the handle cover over a handle. It will also be appreciated that the handle cover components may be provided in any length or lengths, which a user may cut to suit a given size requirement.

While the present description has been herein shown and described in what is presently conceived to be preferred embodiments thereof it is to be understood that the system, combination, and method of the invention are to be accorded the broadest interpretation of the appended claims so as to encompass all equivalent structures and procedures limited only by the prior art. This disclosure is also to be interpreted so as to encompass all narrower ranges within a broad range; for example, a foam density of about 2-40 lbs./ft.$^3$ specifically covers 3.0-33.2, 8.4-30.5, 1.95-6.8, and all other specific ranges within the broad range.

What is claimed is:

1. A covering for a handle or railing comprising: a stability-enhancing interior element adapted to be provided over the handle or railing; and a metal cover adapted to be provided over the stability-enhancing interior element, wherein the metal cover is provided with a pathogen-eliminating outer surface; and, wherein the metal cover comprises first and second cover components, and wherein each of the components include respective mechanically interlocking or inter-engaging elements, whereby, when installed, the first and second components are securely held together and engage the stability-enhancing interior element.

2. The covering of claim 1, wherein the handle or railing comprises a shopping cart handle.

3. The covering of claim 1, wherein said stability-enhancing interior element comprises compression foam which is adapted to operatively engage the handle or railing.

4. The covering of claim 1 further comprising an adhesive for affixing said stability-enhancing interior element to the handle or railing and/or to the cover.

5. The covering of-claim 1, wherein said cover of metal comprises an anodized aluminum cover with an antimicrobial or biocidal coating on the outer surface thereof.

6. A system for sanitizing a handle or railing comprising a retrofit covering for the handle or railing, said retrofit covering including a stability-enhancing interior element, and a cover of metal that is provided with a pathogen-eliminating outer surface,
wherein said metal cover comprises first and second components, and mechanically interlocking or inter-engaging elements which hold said first and second components securely together and engaging the stability-enhancing interior element.

7. The system of claim 6, wherein the handle or railing comprises a shopping cart handle.

8. The system of claim 6, wherein said stability-enhancing interior element comprises compression foam which operatively engages the existing handle or railing.

9. The system of claim 6, wherein said stability-enhancing interior element is attached to the handle or railing with an adhesive.

10. The system of claim 6, wherein said cover of metal comprises an anodized aluminum cover with an antimicrobial or biocidal coating on the outer surface thereof.

11. A kit for providing a cover over a handle or railing, the kit comprising: a stability-enhancing interior element adapted to be provided over the handle or railing; and a metal cover adapted to be provided over the stability-enhancing interior element; wherein the metal cover is provided with a pathogen-eliminating outer surface,
wherein said metal cover comprises first and second cover components, and wherein each of the components include respective mechanically interlocking or inter-engaging elements, whereby, when installed, the first and second components are securely held together and engage the stability-enhancing interior element.

12. The kit of claim 11, wherein the handle or railing comprises a shopping cart handle.

13. The kit of claim 11, wherein said stability-enhancing interior element comprises compression foam which is adapted to operatively engage the handle or railing.

14. The kit of claim 11 further comprising an adhesive for affixing said compression foam to the handle or railing, when the covering is installed.

15. The kit of claim 11, wherein said cover of metal comprises an anodized aluminum cover with an antimicrobial or biocidal coating on the outer surface thereof.

16. A method for retrofitting a sanitary cover on an existing handle or railing, the method comprising:
a) adhesively securing a compression foam to layer over the existing handle or railing; and
b) providing a metal cover over the foam layer, the metal cover having an outer surface with pathogen-eliminating properties, wherein the metal cover comprises an anodized aluminum cover with an outer coating of antimicrobial or biocidal material,
wherein the metal cover is provided as two components and step b) comprises interlocking together or inter-engaging the two components of the cover over the foam layer.

17. The method of claim 16, wherein the handle or railing is a handle of a shopping cart.

* * * * *